US 8,984,281 B2

(12) United States Patent
Nagasaki

(10) Patent No.: US 8,984,281 B2
(45) Date of Patent: Mar. 17, 2015

(54) CERTIFICATE MANAGEMENT NOTIFICATION APPARATUS

(75) Inventor: Takeshi Nagasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 132 days.

(21) Appl. No.: 12/967,034

(22) Filed: Dec. 13, 2010

(65) Prior Publication Data
US 2011/0162085 A1 Jun. 30, 2011

(30) Foreign Application Priority Data
Dec. 25, 2009 (JP) .................................. 2009-295954

(51) Int. Cl.
H04L 29/06 (2006.01)
G06F 21/64 (2013.01)
G06F 21/10 (2013.01)
G06F 21/12 (2013.01)

(52) U.S. Cl.
CPC .............. G06F 21/64 (2013.01); G06F 21/10 (2013.01); G06F 21/12 (2013.01)
USPC ........................................... 713/156; 705/59

(58) Field of Classification Search
CPC ... G06F 21/10; G06F 21/6218; G06F 21/105; H04L 63/0823; H04L 63/0442; H04L 2463/101; H04L 9/3294
USPC ...................... 726/28; 713/156–158
See application file for complete search history.

(56) References Cited

U.S. PATENT DOCUMENTS

| 2006/0021012 | A1* | 1/2006 | Ito ...................................... 726/5 |
| 2006/0200420 | A1* | 9/2006 | Osada ............................. 705/59 |
| 2008/0005029 | A1  | 1/2008 | Ando |
| 2008/0228513 | A1* | 9/2008 | McMillan et al. ................ 705/1 |
| 2009/0133128 | A1  | 5/2009 | Uchikawa |
| 2009/0216785 | A1  | 8/2009 | Sato |
| 2009/0265361 | A1* | 10/2009 | Nagami et al. .................. 707/10 |
| 2010/0100565 | A1* | 4/2010 | Adachi ......................... 707/781 |

FOREIGN PATENT DOCUMENTS

| CN | 1539111 A | 10/2004 |
| JP | 2004-297333 A | 10/2004 |
| JP | 2006-005613 A | 1/2006 |

(Continued)

OTHER PUBLICATIONS

European Patent Office, Extended European Search Report for European Patent Application No. 10252075.6 (counterpart to above-captioned patent application), dated Apr. 11, 2011.

(Continued)

Primary Examiner — Matthew Smithers
Assistant Examiner — Gregory M Elmore
(74) Attorney, Agent, or Firm — Baker Botts L.L.P.

(57) ABSTRACT

An information processing apparatus including: a storage unit configured to store a plurality of applications and a plurality of certificates, an application execution unit configured to execute one of the plurality of applications by using one of the plurality of certificates which is designated by a user, and a storage control unit configured to control the storage unit to store correspondence information indicating that the executed application corresponds to the designated certificate, when the application execution unit executes one of the plurality of applications and one of the plurality of certificates is designated by the user.

11 Claims, 5 Drawing Sheets

(56) References Cited

FOREIGN PATENT DOCUMENTS

| JP | 2006-059141 A | 3/2006 |
|----|---------------|--------|
| JP | 2006-270504 A | 10/2006 |
| JP | 2009-206697 A | 9/2009 |
| WO | 02/101580 A1 | 12/2002 |

OTHER PUBLICATIONS

State Intellectual Property Office of the People's Republic of China, Notification of the Second Office Action for Chinese Patent Application No. 201010623068.7 (counterpart to above-captioned patent application), mailed Sep. 9, 2013.

The State Intellectual Property Office of the People's Republic of China, Notification of First Office Action for Chinese Patent Application No. 201010623068.7 (counterpart Chinese patent application), issued Mar. 11, 2013.

Japan Patent Office, Notification of Reasons for Refusal for Japanese Patent Application No. 2009-295954 (counterpart to above-captioned patent application), mailed Jun. 11, 2013.

* cited by examiner

US 8,984,281 B2

CERTIFICATE MANAGEMENT NOTIFICATION APPARATUS

CROSS-REFERENCE TO RELATED APPLICATIONS

This application claims priority from Japanese Patent Application No. 2009-295954 filed on Dec. 25, 2009, the entire contents of which are incorporated herein by reference.

TECHNICAL FIELD

Aspects of the present invention relate to an information processing apparatus that executes a plurality of applications.

BACKGROUND

There has been proposed a related-art information processing apparatus that executes a plurality of applications. In the related-art information processing apparatus, a "validating function" is included in each of a plurality of certificates that is stored by the information processing apparatus. For each of the applications, an execution of the application is controlled based on the "validating function" included in the certificate that is designated to be used for executing the application.

SUMMARY

In the related-art information processing apparatus, even when there is a certificate that is not used for execution of any application, it is difficult to specify the certificate. Thus, for example, even when a user wants to delete an unnecessary certificate, the user does not know which certificate to delete. Accordingly, one aspect of the present invention is to provide an information processing apparatus appropriately storing correspondence information of an application and a certificate to be used for execution of the application and thus capable of appropriately managing the certificate to be stored.

According to an exemplary embodiment of the present invention, there is provided an information processing apparatus comprising: a storage unit configured to store a plurality of applications and a plurality of certificates; an application execution unit configured to execute one of the plurality of applications by using one of the plurality of certificates, which is designated by a user; and a storage control unit configured to control the storage unit to store correspondence information indicating that the executed application corresponds to the designated certificate, when the application execution unit executes one of the plurality of applications and one of the plurality of certificates is designated by the user.

A control method and a computer program for realizing the information processing apparatus are also newly provided.

DETAILED DESCRIPTION OF EXEMPLARY EMBODIMENTS (Exemplary Embodiments)
(System Configuration)

Figure 1:
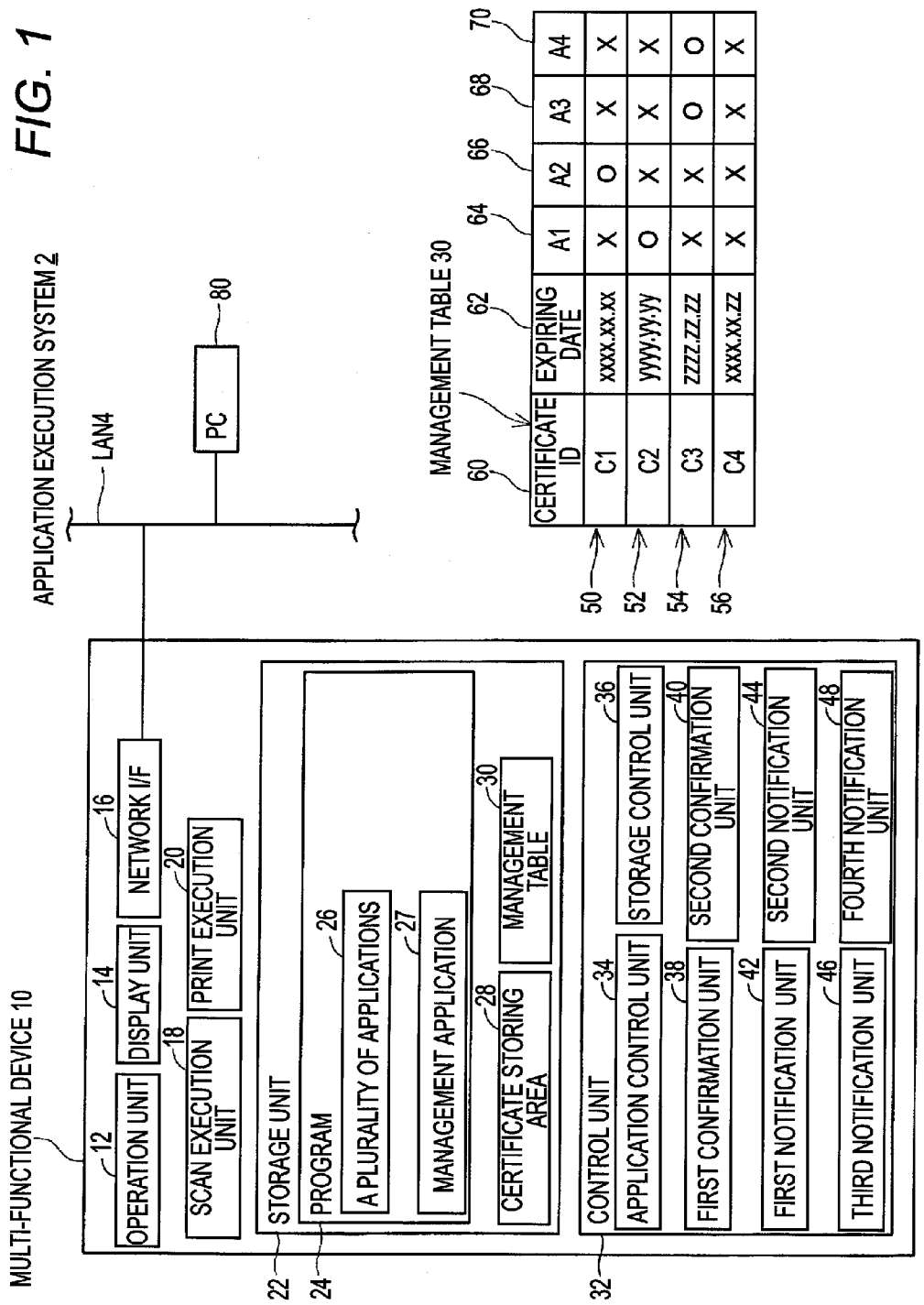
FIG. 1 shows an example of an application execution system.

An exemplary embodiment of the present invention will be described with reference to the drawings. FIG. 1 is a schematic view of an application execution system 2 of the present exemplary embodiment. The application execution system 2 includes a LAN 4, a multi-functional device 10 and a PC 80. Both the multi-functional device 10 and the PC 80 are connected to the LAN 4. The multi-functional device 10 and the PC 80 can communicate with each other via the LAN 4.

(Configuration of Multi-Functional Device 10)

Configuration of the multi-functional device 10 will now be described. The multi-functional device 10 has a plurality of functions such as a copy function, a printer function, a scanner function, an e-mail transmitting and receiving function, internet FAX function, and the like. The multi-functional device 10 includes an operation unit 12, a display unit 14, a network interface 16, a scan execution unit 18, a print execution unit 20, a storage unit 22 and a control unit 32. The operation unit 14 includes a plurality of keys. A user can input a variety of instructions to the multi-functional device 10 by operating the operation unit 12. The display unit 14 can display a variety of information. The network interface 16 is connected to the LAN 4. The scan execution unit 18 includes a scanning mechanism such as CIS and CCD, and produces image data by scanning an object. The print execution unit 20 includes a print mechanism of an ink jet head style or a laser style, and executes printing according to instructions from the control unit 32.

The storage unit 22 stores a program 24, a certificate storing area 28 and a management table 30. The program 24 includes a plurality of applications 26 for realizing the above functions of the multi-functional device 10. In addition, the program 24 includes a management application 27 that manages the applications 26 and a plurality of certificates of the multi-functional device 10. The control unit 32 executes a process in accordance with the program 24 stored in the storage unit 22. As the control unit 32 executes a process in accordance with the program 24, functions of respective units 34 to 48 are realized.

The certificate storing area 28 stores the plurality of certificates that are used in the respective applications of the multi-functional device 10. The management table 30 includes a plurality of combination information 50 to 56. Each of the plurality of combination information 50 to 56 is information in which a certificate ID 60, an expiring date 62 and designation information 64 to 70 corresponding to applications A1 to A4 are related to each other. The certificate ID 60 is identification information for identifying the respective certificates stored in the certificate storing area 28. The expiring date 62 is information that indicates date and time of the expiring date of a certificate indicated by the certificate ID 60. The designation information 64 of the application A1 is information indicating whether each certificate indicated by the certificate ID 60 is designated as a certificate that should be used in executing the application A1. A certificate whose designation information 64 is "○" indicates that it is designated as a certificate that should be used in executing the application A1. For example, in the management table 30 of FIG. 1, the designation information 64 of the certificate ID "C2" is "○." This indicates that a certificate indicated by the certificate ID "C2" is designated as a certificate that should be used in executing the application A1. Meanwhile, a certificate whose designation information 64 is "x" indicates that it is not designated as a certificate that should be used in executing the application A1. For example, in the management table 30 of FIG. 1, the designation information 64 of the certificate ID "C1" is "x." This indicates that a certificate indicated by the certificate ID "C1" is not designated as a certificate that should be used in executing the application A1. The designation information 66 to 70 corresponding to the applications A2 to A4 is also the same as the designation information 64.

Hereinafter, a state in which a specific certificate is designated as a certificate that should be used in executing a specific application (a state in which "○" is recorded in the designation information 64, and the like) may also be described as "a specific certificate corresponds to a specific application." In addition, to rewrite the designation information 64 and the like from "x" to "○" may also be described as "to make a correspondence" and to rewrite the designation information 64 and the like from "○" to "x" may also be described as "to cancel a correspondence."

In addition, when a certificate that should be used in executing an application corresponds to the application, each of the applications 26 store a certificate ID indicating the certificate as one of setting information of the application. The storage unit 22 includes a setting storing area (not shown) for storing setting information of the application, for each of the applications 26.

(Processes to be Executed by Multi-Functional Device 10)

In the followings, each process that is executed by the control unit 32 of the multi-functional device 10 will be described with reference to FIGS. 2 to 6.

(Startup Process)

First, a startup process that is executed when an application starts up will be described with reference to FIG. 2. In addition, an application A1 will be described as an example of the applications. However, the same process is also executed for the other applications A2 to A4. Hereinafter, an example will be described in which the application A1 and a certificate indicated by the certificate ID "C2" have been already made to correspond to each other at the start of the startup process, resulting from a certificate designating process (refer to FIG. 3) that will be described later. In this example, the application A1 stores the certificate ID "C2" as one of the setting information of the application A1. When the power of the multi-functional device 10 is on, a user can operate the operation unit 12 of the multi-functional device 10 or an operation unit (not shown) of the PC 80 connected to the multi-functional device 10 so as to input a startup instruction 102 for starting up the application A1 to the multi-functional device 10.

When the startup instruction 102 is inputted, the control unit 32 starts up the application A1. Then, the control unit 102 transmits a request 104 for confirming whether a certificate exists to the management application, in accordance with the application A1. The request 104 includes a certificate ID that the application A1 stores as one of the setting information. The control unit 32 executing a process in accordance with an application (or a management application) may be described as "the application executes a process," rather than "the control unit 32 executes a process." In the above example, since the application A1 already stores the certificate ID "C2" indicating the certificate that has been made to correspond to the application A1, the certificate ID "C2" is included in the request 104. The control unit 32 executes a process to confirm whether the certificate ID corresponding to the application A1 exists in the management table 30, in accordance with the management application 27 (S2). For example, in the management table 30 of FIG. 1, the certificate ID "C2" and the application "A1" are made to correspond to each other. In this case, the control unit 32 determines "YES" in S2.

When a determination result of S2 is "NO," i.e., when the certificate ID "C2" is deleted from the management table 30 by a certificate deleting process (FIG. 6) that will be described later and thus does not exist therein, a second notification unit 44 (refer to FIG. 1) transmits to the application A1 a non-existence notification 106 indicating that the specific certificate made to correspond to the application A1 has been deleted, in accordance with the management application 27 (S4). In this case, the second notification unit 44 causes the display unit 14 of the multi-functional device 10 or a display unit (not shown) of the PC 80 to display that the specific certificate corresponding to the application A1 has been deleted, in accordance with the application A1 (S6). Thereby, a user can know that the certificate corresponding to the application A1 has been deleted and thus does not exist.

In the meantime, when a determination result of S2 is YES, a second confirmation unit 40 (refer to FIG. 1) confirms whether the certificate corresponding to the application A1 is currently valid, in accordance with the management application 27 (S8). In S8, the second confirmation unit 40 first obtains current date and time. Then, the second confirmation unit 40 specifies an expiration date 62 that is related to the certificate ID 60 which corresponds to the application A1, from the management table 30. The second confirmation unit 40 compares the specified expiration date 62 with the current date and time. As a result of the comparison, when the current date and time is later than the specified expiration date 62, the second confirmation unit 40 determines "NO" in S8. In the meantime, when the specified expiration date 62 is later than the current date and time, the second confirmation unit 40 determines "YES" in S8.

When a determination result of S8 is NO, a third notification unit 46 (refer to FIG. 1) transmits to the application A1 a expiration notification 108 indicating that the expiration date of the certificate corresponding to the application A1 has expired, in accordance with the management application 27 (S10). In this case, the third notification unit 46 causes the display unit 14 of the multi-functional device 10 or the display unit (not shown) of the PC 80 to display that the expiration date of the certificate corresponding to the application A1 has expired, in accordance with the application A1 (S12). Thereby, a user knows that the expiration date of the certificate corresponding to the application A1 has expired.

Meanwhile, when a determination result of S8 is YES, the management application 27 shifts to a standby state in which it stands until a next instruction is inputted by a user. When the process of S6 or S8 ends, the application A1 also shifts to a standby state. When the respective processes are completed, the multi-functional device 10 terminates the startup process. The above description is based on an exemplary state in which the application A1 and the certificate indicated by the certificate ID "C2" already correspond to each other at the start of the startup process.

Contrary to the above example, there may be a case where there are no certificates that correspond to the application A1 at the start of the startup process. In this case, when a user inputs a startup instruction 102, only a process of starting up the application A1 is carried out without performing the processes of S2 to S12. Hereinafter, such a startup process may be called as a "typical startup process." During the typical startup process, information indicating that no certificates correspond to the application A1 may be displayed on the display unit 14 of the multi-functional device 10 and the like in accordance with the application A1.

(Certificate Designating Process)

Continuously, a certificate designating process will be described with reference to FIG. 3. In order to execute this process, as a precondition, the application A1 needs to have been started up. The application A1 may have been started up in accordance with the startup process shown in FIG. 2 or the typical startup process. A user can operate the operation unit 12 of the multi-functional device 10 or the operation unit of the PC 80 and thus input a certificate designation instruction 120, which designates a specific certificate (for example, a certificate indicated by a certificate ID "C4") that will be used in executing the application A1, to the multi-functional device 10. The certificate designation instruction 120 includes a certificate ID (for example, a certificate ID "C4") designated by the user.

When the certificate designation instruction 120 is inputted, the control unit 32 transmits a certificate designation notification 122 including the certificate ID (for example, "C4"), which is included in the certificate designation instruction 120, to the management application 27, in accordance with the application A1. In this case, the control unit 32 checks whether a certificate made to correspond to the application A1 exists in the management table 30, in accordance with the management application 27 (S20). Specifically, the control unit 32 determines "YES" in S20 when the certificate ID (for example, "C4") which is included in the certificate designation notification 122, and the certificate ID (for example, "C2") which currently corresponds to the application A1, are different. Meanwhile, the control unit 32 determines "NO" in S20 when the certificate ID which is included in the certificate designation notification 122, and the certificate ID which currently corresponds to the application A1, are the same. In this case, the control unit 32 does not execute processes of S30 and S32 that will be described later. Additionally, the control unit 32 also determines "NO" in S20 when all the designation information 64 corresponding to the application A1 are "x" in the management table 30. In this case, the control unit 32 proceeds to S30 and S32 that will be described later.

When a determination result of S20 is YES, a fourth notification unit 48 (refer to FIG. 1) transmits to the application A1 a warning notification 124 indicating that a certificate indicated by the certificate ID (for example, "C2") currently corresponds to the application A1, in accordance with the management application 27 (S22). The warning notification 124 includes the certificate ID (for example, "C2") indicating the certificate currently corresponding to the application A1.

Then, the fourth notification unit 48 causes the display unit 14 of the multi-functional device 10 or the display unit of the PC 80 to display a predetermined warning in accordance with the application A1 (S24). The warning in S24 includes a character string indicating that the application A1 and the certificate ID (for example, "C2") included in the warning notification 124 correspond to each other. In addition, the warning in S24 includes a character string enabling a user to select whether or not to use a newly designated certificate (for example, "C4").

The user operates the operation unit 12 of the multi-functional device 10 or the operation unit of the PC 80 and thus selects whether or not to use a newly designated certificate (for example, "C4"). Thereby, according to the selection of the user, a user instruction 126 indicating "use" or a user instruction 126 indicating "disuse" is inputted to the multi-functional device 10. The control unit 32 checks whether the user instruction 126 indicates "use" or "disuse" in accordance with the application A1 (S26). When the user instruction 126 indicates "use" (i.e., the user instruction is an approval instruction), the control unit determines YES in S26. When the user instruction 126 indicates "disuse" (i.e., the user instruction is a disapproval instruction), the control unit determines NO in S26. When a determination result of S26 is YES, the control unit 32 transmits an approval notification 128 to the management application 27 in accordance with the application A1 (S28). When the management application 27 receives the approval notification or when a determination result of S20 is NO, a storage control unit 36 (refer to FIG. 1) updates the designation information 64 of the application A1 in the management table 30 in accordance with the management application 27 (S30). The process that the storage control unit 36 executes in S30 is different for a case in which the process went through S28 and for a case where a determination result of S20 is NO.

In the process of S30 for a case in which the process went through S28, the storage control unit 36 changes the designation information 64 of the application A1 from "○" to "x" at this point. In other words, the correspondence of the application A1 and the certificate is cancelled (i.e., the correspondence is deleted). Then, the storage control unit 36 changes the designation information 64, which is related to the certificate ID (for example, "C4") included in the certificate designation notification 122, from "x" to "○". In other words, a certificate, which is indicated by the certificate ID included in the certificate designation notification 122, and the application A1 are newly made to correspond to each other.

In the process of S30 for a case where a determination result of S20 is NO, the storage control unit 36 changes the designation information 64, which is related to the certificate ID (for example, "C4") included in the certificate designation notification 122, from "x" to "○". In other words, the storage control unit 36 registers a new correspondence of a certificate indicated by the certificate ID (for example, "C4") and the application A1.

When the process of S30 is completed, the control unit 32 transmits an update completion notification 130 indicating that the update has been completed to the application A1, in accordance with the management application 27 (S32). In this case, the control unit 32 causes the display unit 14 of the multi-functional device 10 or the display unit of the PC 80 to display the information indicating that the update has been completed, in accordance with the application A1 (S34). Thereby, a user can know that the process of changing the certificate, which is used in executing the application A1, has been completed.

In addition, when the processes of S30 to S34 are completed, the application A1 stores a certificate ID (for example, "C4"), which indicates a new certificate that should be used in executing the application A1, as one of the setting information. At this time, when the application A1 already stores a different certificate ID (for example, "C2"), the application A1 changes (overwrites) the certificate ID (for example, "C2") already stored to a new certificate ID (for example, "C4") and stores it.

Meanwhile, when a determination result of S26 is NO, the control unit 32 transmits a disapproval notification 132 indicating that the above change is not approved to the management application 27, in accordance with the application A1 (S36). In this case, the storage control unit 36 does not execute the management table updating process S30. When the respective processes are completed, the multi-functional device 10 terminates the certificate designating process.

(Certificate Designation Cancelling Process)

Figure 4:
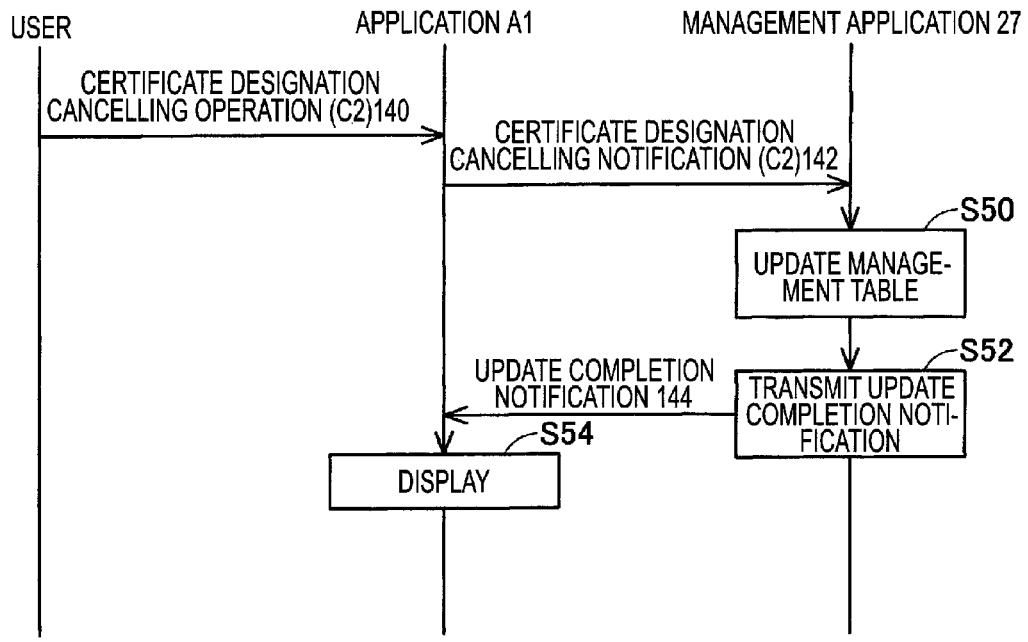
FIG. 4 shows a sequence diagram of a certificate designation cancelling process that is performed by a multi-functional device.

Continuously, a certificate designation cancelling process will be described with reference to FIG. 4. A precondition for this process will be described. First, the application A1 has already been started up in accordance with the above startup process. Second, a certificate (for example, a certificate corresponding to the certificate ID "C2") corresponding to the application A1 exists. A user can operate the operation unit 12 of the multi-functional device 10 or the operation unit of the PC 80, thereby inputting a certificate designation cancelling instruction 140 for cancelling the correspondence of the application A1 and the certificate to the multi-functional device 10. The certificate designation cancelling instruction 140 includes a certificate ID (for example, certificate ID "C2") whose designation will be cancelled.

Then, the control unit 32 transmits a certificate designation cancelling notification 142, which includes the certificate ID (for example, "C2") included in the certificate designation cancelling instruction 140, to the management application 27 in accordance with the application A1. In this case, the storage control unit 36 executes a management table updating process in accordance with the management application 27 (S50). Specifically, in S50, the storage control unit 36 changes the designation information 64, which is related to the certificate ID (for example, "C2") included in the certificate designation cancelling notification 142, from "○" to "x". In other words, the storage control unit 36 cancels the correspondence of the certificate, which is indicated by the certificate ID (for example, "C2") included in the certificate designation cancelling notification 142, and the application A1 (i.e., the correspondence is deleted). When the management table updating process is completed, the control unit 32 transmits an update completion notification 144 indicating that the update is completed to the application A1, in accordance with the management application 27. In this case, the control unit 32 causes the display unit 14 of the multi-functional device 10 or the display unit of the PC 80 to display that the update is completed, in accordance with the application A1 (S54). Thereby, the user recognizes that the process of cancelling the certificate that is used in executing the application A1 is completed.

When the respective processes have been completed, the application A1 deletes the certificate ID (for example, "C2"), which is stored as one of the setting information and which should be used in executing the application A1, from the setting information.

(Application Executing Process)

Figure 5:
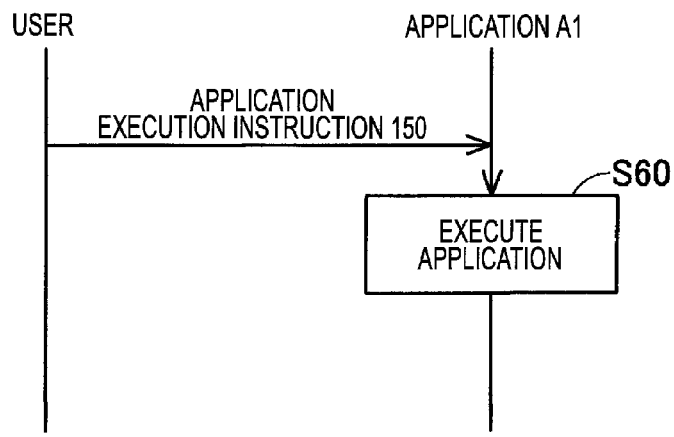
FIG. 5 shows a sequence diagram of an application executing process that is performed by a multi-functional device.

An application executing process will be described with reference to FIG. 5. A precondition for this process will be described. First, the application A1 has already been started up in accordance with the startup process described-above. Second, a certificate (for example, a certificate corresponding to the certificate ID "C2") that corresponds to the application A1 exists. A user can operate the operation unit 12 of the multi-functional device 10 or the operation unit of the PC 80, thereby inputting an application execution instruction 150 for requesting an execution of the application A1 to the multi-functional device 10. In this case, an application execution unit 34 (refer to FIG. 1) executes the application A1 by using a certificate (for example, a certificate indicated by the certificate ID "C2") that currently corresponds to the application A1 (S60).

(Certificate Deleting Process)

A certificate deleting process will be described with reference to FIG. 6. When the power of the multi-functional device 10 is on, a user can operate the operation unit 12 of the multi-functional device 10 and the like, thereby inputting a management table display instruction 160 for requesting a display of the management table 30 to the multi-functional device 10. When the management table display instruction 160 is inputted, the control unit 32 starts up the management application 27. Then, the control unit 32 causes the display unit 14 of the multi-functional device 10 and the like to display the management table 30 stored in the storage unit 22, in accordance with the management application 27 (S70). Accordingly, the user can input a certificate deletion instruction 162 for deleting a predetermined certificate (for example, a certificate corresponding to the certificate ID "C2") in the management table 30 from the storage unit 22 to the multi-functional device 10, by operating the operation unit 12 of the multi-functional device 10 and the like. The certificate deletion instruction 162 includes a certificate ID (for example, "C2") indicating a certificate to be deleted (hereinafter, referred to as "deletion object certificate").

When the certificate deletion instruction 162 is inputted, a first confirmation unit 38 (refer to FIG. 1) checks whether there is an application corresponding to the certificate ID (for example, "C2") included in the certificate deletion instruction 162, in accordance with the management application 27 (S72). For example, in the management table 30 of FIG. 1, the certificate ID "C2" and the application "A1" corresponds to each other. In this case, the first confirmation unit 38 determines "YES" in S72.

When a determination result of S72 is YES, a first notification unit 42 (refer to FIG. 1) displays a warning indicating that there is an application corresponding to the deletion object certificate shown in the display unit 14 of the multi-functional device 10 and the like, in accordance with the management application 27 (S74). The warning in S74 includes a character string indicating the identification information (for example, "A1") identifying all applications corresponding to the deletion object certificate. In addition, the warning in S74 includes a character string enabling a user to select whether or not to delete the deletion object certificate.

The user operates the operation unit 12 of the multi-functional device 10 and the like, thereby selecting whether or not to delete the deletion object certificate. Thereby, according to the selection of the user, a user instruction 164 indicating "deletion" or a user instruction 164 indicating "non-deletion" is inputted to the multi-functional device 10. The control unit 32 checks whether the user instruction 164 indicates "deletion" or "non-deletion", in accordance with the management application 27 (S76). When the user instruction 164 indicates "deletion" (approval instruction), the control unit determines "YES" in S76. When the user instruction 164 indicates "non-deletion" (disapproval instruction), the control unit determines "NO" in S76.

When a determination result of S76 is YES or when a determination result of S72 is NO, the storage control unit 36 executes a management table updating process in accordance with the management application 27 (S78). Specifically, in S78, the storage control unit 36 deletes the combination information (for example, 52) which is in the management table 30 and which includes the certificate ID (for example, "C2") indicating the deletion object certificate, in accordance with the management application 27. Further, the storage control unit 36 deletes the deletion object certificate from the certificate storing area 28 (refer to FIG. 1) in the storage unit 22. When the management table updating process of S78 is completed, the control unit 32 causes the display unit 14 of the multi-functional device 10 and the like to display the update completion of the management table 30, in accordance with the management application 27 (S80). Thereby, the user can know that the process of deleting the deletion object certificate is completed.

Meanwhile, when a determination result of S76 is NO, the storage control unit 36 does not execute the management table updating process (S78). The combination information (for example, 52) including the certificate ID (for example, "C2") indicating the deletion object certificate is kept in the management table 30. Further, the deletion object certificate is also kept in the certificate storing area 28 of the storage unit 22. When the respective processes are completed, the multi-functional device 10 terminates the certificate deleting process.

The exemplary embodiment of the present invention has been specifically described. According to the multi-functional device 10 of the above-described exemplary embodiment, as shown in the management table 30 of FIG. 1, the certificate ID and the designation information "○" are stored so as to correspond to each other. When a user wants the multi-functional device 10 to execute a desired application, the user can designate a certificate to be used in the desired application and store the certificate ID and the designation information "○" so as to correspond to each other. When installing a certificate, it is not necessary for the user to determine an application that corresponds to the certificate. The multi-functional device 10 can notify the user with the management table 30. Accordingly, if a certificate (hereinafter, referred to as "specific certificate") that does not correspond to an application is stored in the storage unit, the user can easily find the specific certificate. In this case, the user can delete the specific certificate from the storage unit. As a result, it is possible to reduce the number of certificates that should be stored in the multi-functional device 10.

Figure 6:
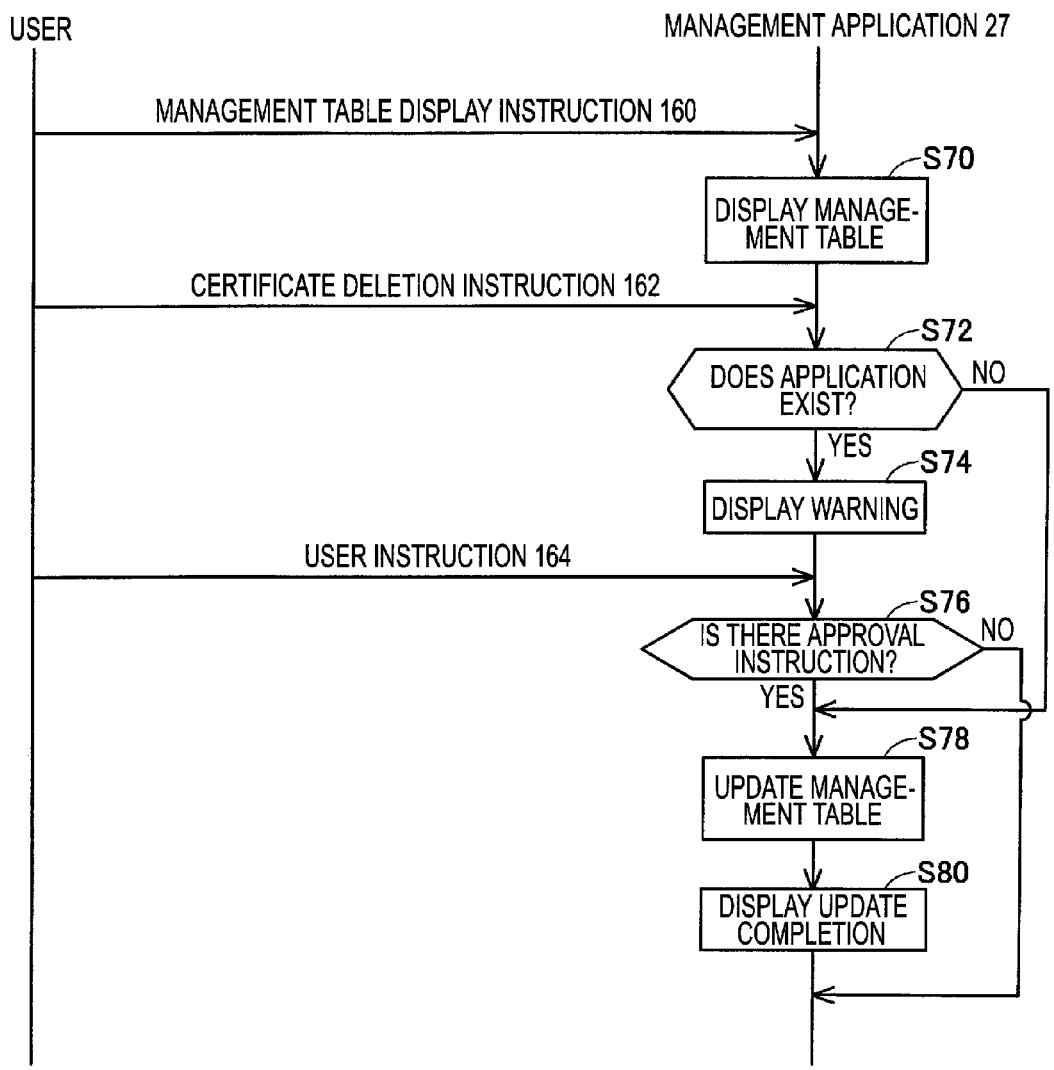
FIG. 6 shows a sequence diagram of a certificate deleting process that is performed by a multi-functional device.

As shown in FIG. 6, when the user inputs the certificate deletion instruction 162 to delete the deletion object certificate, the multi-functional device 10 of the above-described exemplary embodiment checks whether there is an application corresponding to the deletion object certificate (S72). When there is an application (S72: YES), the multi-functional device displays to the user a warning that there is an application corresponding to the deletion object certificate (S74). Since the warning is displayed, the user can know that an application corresponds to the deletion object certificate which the user instructed to delete. Accordingly, the user can check whether or not to delete the deletion object certificate. In particular, in a case where one certificate corresponds to a plurality of applications, even when a user does not recognize all the applications corresponding to the certificate, it is possible to prevent the user from deleting the certificate accidentally.

Figure 2:
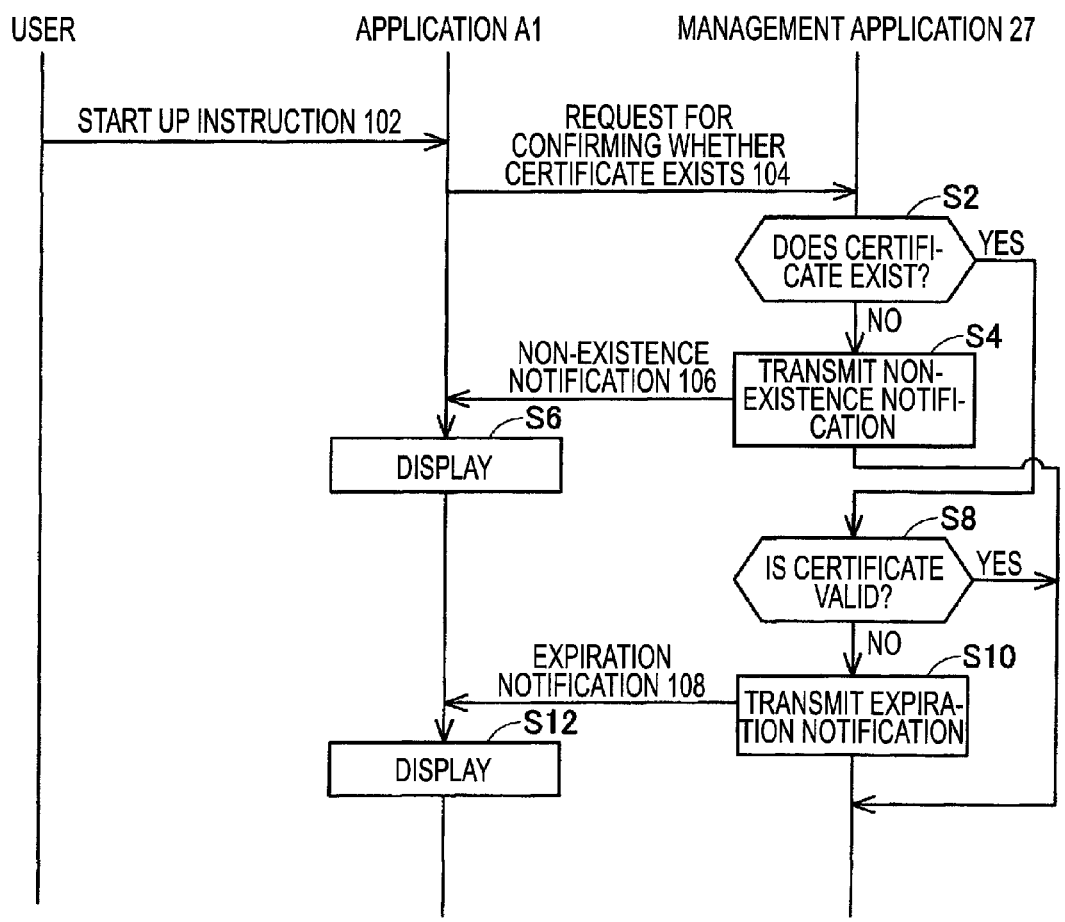
FIG. 2 shows a sequence diagram of a startup process that is performed by a multi-functional device.

As shown in FIG. 2, the multi-functional device 10 of the above-described exemplary embodiment notifies a user with information that there is not a certificate that corresponds to the application A1 when the application A1 starts up. The user can know that a certificate corresponding to the application A1 has been deleted, for example.

As shown in FIG. 2, the multi-functional device determines a validity of a certificate that corresponds to the application A1 when the application A1 starts up. When the certificate is not valid, the multi-functional device notifies the user with the information. The user can know that the certificate corresponding to the application A1 is not valid when the application A1 starts up, for example.

Figure 3:
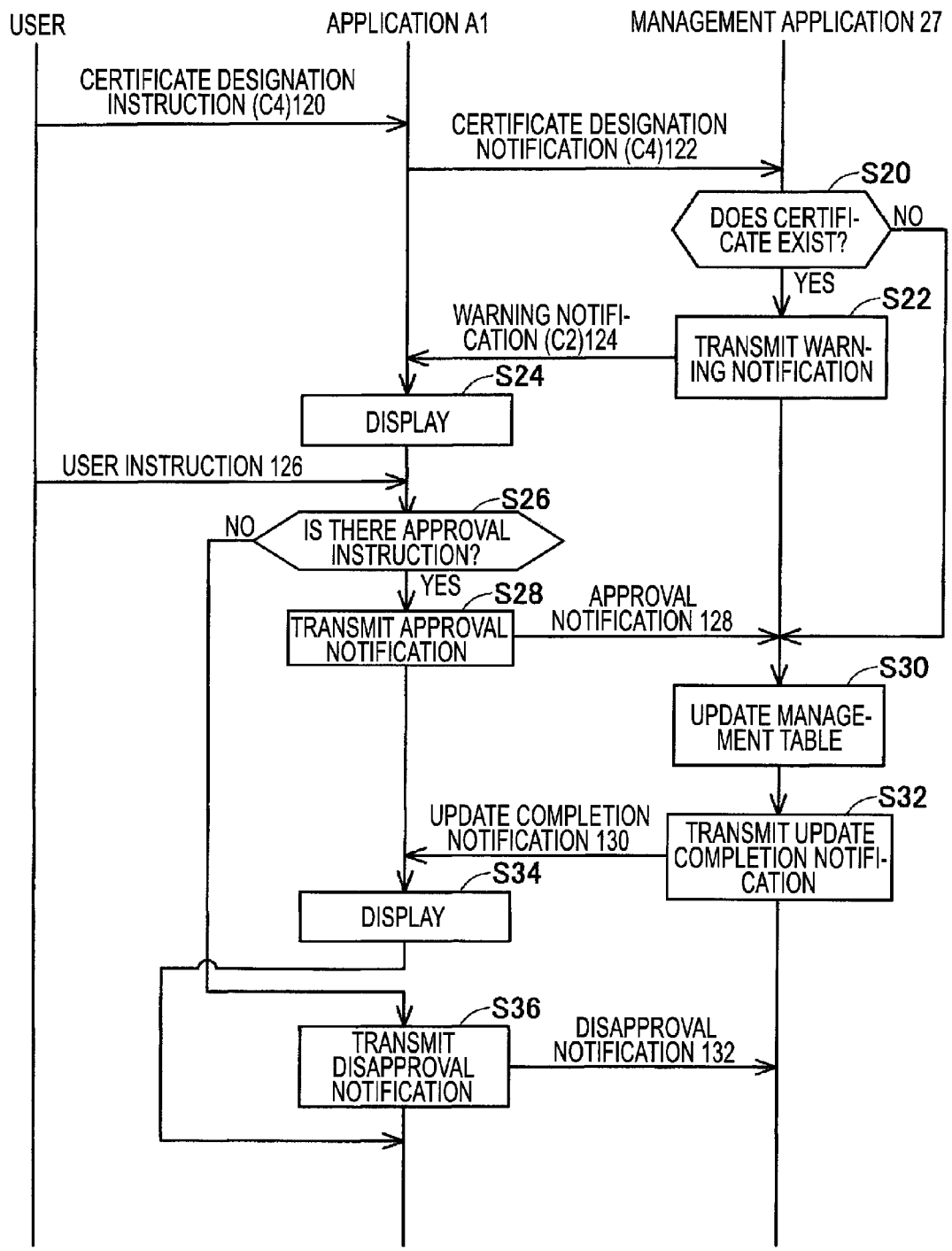
FIG. 3 shows a sequence diagram of a certificate designating process that is performed by a multi-functional device.

As shown in FIG. 3, when the application A1 is executed, a user may designate a new certificate (for example, "C4") different from the certificate (for example, "C2") that corresponds to the application A1. In this case, the multi-functional device 10 automatically updates the correspondence of the application and the certificate. Thus, it is not necessary for the user to execute the update of the correspondence again. At this time, as shown in S24 of FIG. 3, a warning is displayed. Thus, even though the user designated the certificate (for example, "C2"), which currently corresponds to the application A1 when the application A1 was executed last time, the user can know that a new certificate (for example, "C4") different from the certificate (for example, "C2") which currently corresponds to the application A1 is designated when the application A1 is executed this time.

Additionally, in the above-described exemplary embodiment, as shown in S4, S6, S10 and S12 of FIG. 2, for example, the control unit 32 of the multi-functional device 10 causes the display unit 14 of the multi-functional device 10 to display a variety of information, such as information that a certificate corresponding to the application A1 is deleted (i.e., does not exist) and information that the expiration date of the certificate has expired, in accordance with the application A1. However, the management application may enable the display 14 of the multi-functional device 10 and the like to display the information in accordance with the management application, rather than the application A1.

In the above-described exemplary embodiment, as shown in S8 of FIG. 2, in order to determine the validity of a certificate, whether the expiration date of the certificate has expired or not was confirmed. However, in addition to the expiration date, the validity of a certificate may be determined, based on the other criteria such as a determination of whether the certificate is included in a predetermined invalidation list.

The exemplary embodiments of the invention have been described above. However, the scope of claims may not be restricted by the above-described exemplary embodiments. The technology described in the claim also includes variations and modifications of the above-described exemplary embodiments. In addition, technical elements explained in the description and the drawings can be used independently or in combination so as to achieve technical utility, and is not restricted by the combination recited in the claims. In addition, a plurality of purposes can be achieved at the same time by the technology described in the description and the drawings, and by achieving one of the pluralities of purposes, technical utility can be achieved.

In the above-described exemplary embodiments, functions of the units are implemented by software. However, the functions of the units, or at least a part of thereof, may be implemented by hardware.

The invention claimed is:

1. An information processing apparatus comprising:
a storage unit configured to store a plurality of applications and a plurality of certificates used for a user or device that executes an application to be authenticated; and
a processor configured to operate as:
an application execution unit configured to execute one of the plurality of applications by using a designated one of the plurality of certificates; and
a storage control unit configured to control the storage unit to store correspondence information indicating that the executed application corresponds to the designated certificate, when the application execution unit executes one of the plurality of applications and one of the plurality of certificates is designated,
wherein the storage unit further stores a management application that manages the plurality of certificates, and
wherein the processor is further configured to operate as:
a first confirmation unit configured to confirm whether first correspondence information relating to a first certificate is stored in the storage unit by confirming whether each application corresponds to the first certificate, when an instruction to delete the first certificate from the storage unit is input by a user to the management application,
a first notification unit configured to generate a notification comprising first information about a first application that corresponds to the first certificate according to the first correspondence information when it is confirmed that the first correspondence information is stored in the storage unit, the notification comprising the first information being generated after the instruction to delete the first certificate from the storage unit is input by the user and before deleting the first certificate from the storage unit, and
a second notification unit configured to, when a startup process of the first application is started and there are no certificates corresponding to the first application:
generate a notification comprising second information indicating that there are no certificates corresponding to the first application, if the first certificate has been deleted and before a different certificate, which is to be used in executing the first application, is newly designated instead of the first certificate, and
not generate the notification comprising the second information and the startup process is carried out, if none of the certificates have ever been designated as the certificate for executing the first application.

2. The information processing apparatus according to claim 1, further comprising a second confirmation unit and a third notification unit,
wherein the storage unit further stores validity information indicating validity of a corresponding certificate for each of the certificates,
wherein the processor is further configured to operate as:
a second confirmation unit configured to confirm whether a second certificate is valid based on the validity information relating to the second certificate when second correspondence information indicating that a second application and the second certificate correspond to each other is stored in the storage unit and an operation for starting up the second application is executed, and
a third notification unit configured to generate a notification comprising third information indicating that the second certificate is not valid when it is confirmed that the second certificate is not valid.

3. The information processing apparatus according to claim 2,
wherein the third notification unit is configured to generate the notification comprising the third information in accordance with the second application.

4. The information processing apparatus according to claim 1,
wherein in a specific case where third correspondence information indicating that a third application and a third certificate that correspond to each other is stored in the storage unit and a fourth certificate is designated in executing the third application, the storage control unit is configured to delete the third correspondence information and further store fourth correspondence information indicating that the third application and the fourth certificate correspond to each other in the storage unit.

5. The information processing apparatus according to claim 4,
wherein the processor is further configured to operate as:
a fourth notification unit configured to generate a notification comprising fourth information, which indicates that the third application and the third certificate correspond to each other, in the specific case and before the third correspondence information is deleted.

6. The information processing apparatus according to claim 1,
wherein the processor is further configured to operate as:
a certificate information notifying unit configured to generate a notification comprising a plurality of certificate information including the correspondence information, and
wherein the instruction to delete the first certificate from the storage unit is input by the user by designating certificate information relating to the first certificate from the plurality of certificate information included in the notification generated by the certificate information notifying unit.

7. The information processing apparatus according to claim 1,
wherein the storage unit is configured to store a management table including designation information, which is information indicating whether each of the plurality of certificates is designated as a certificate that should be used in executing each application, and
wherein the first confirmation unit is configured to read out designation information related to the first certificate instructed to be deleted from the management table, and confirm whether the first certificate is designated as a certificate that should be used in at least one of the plurality of applications.

8. The information processing apparatus according to claim 1,
wherein, when the application execution unit executes a first specific application and a specific certificate is designated and the application execution unit executes a second specific application and the specific certificate is designated, the stage control unit is configured to control the storage unit to store a first specific correspondence information indicating that the first specific application corresponds to the specific certificate and a second specific correspondence information indicating that the second specific application corresponds to the specific certificate, and
wherein, when an instruction to delete the specific certificate is input, the first notification unit generates the notification comprising the first information about both the first specific application and the second specific application.

9. A multi-functional device comprising:
a print execution unit;
a scan execution unit;
a network interface;
a storage unit configured to store a plurality of applications including a specific application, a plurality of certificates used for a user or device that executes an application to be authenticated, including a specific certificate, and a management table; and
a control device configured to:
implement an e-mail function and an internet facsimile function by using at least one of the network interface, the print execution unit, and a scan execution unit;
when externally receiving an instruction to register the specific certificate in correspondence with the specific application, store correspondence information indicating that the specific application corresponds to the specific certificate in the management table, for each specific application for implementing each function, when externally receiving an instruction to implement a function by executing the specific application:
- identify the specific certificate by referring to the management table, read out the specific certificate stored in the storage unit, and implement the function by using the specific certificate, when the specific application corresponds to the specific certificate, and
- implement the function without using the certificate, when the specific application does not correspond to any certificate;

when externally receiving an instruction to delete the specific certificate from the storage unit, confirm whether an application corresponding to the specific certificate is registered in the management table, and when it is confirmed that there is an application corresponding to the specific certificate, notify that there is an application corresponding to the specific certificate on a notification unit;

when externally receiving an instruction to delete the specific certificate from the storage unit, delete the specific certificate from the storage unit;

when externally receiving an instruction to start the specific application, determine whether a certificate has ever been registered in correspondence with the specific application;

when the instruction to start the specific application is received and it is determined that a certificate has ever been registered in correspondence with the specific application, refer to the management table and determine whether the specific application currently corresponds with a certificate, and when the instruction to start the specific application is received and it is determined that the specific application currently does not correspond with a certificate, notify that a certificate has been deleted on the notification unit and start the specific application; and when the instruction to start the specific application is received and it is determined that no certificate has ever been registered in correspondence with the specific application, start the specific application without notifying that a certificate has been deleted on the notification unit.

10. The multi-functional device according to claim 9, wherein the control device is further configured to:
- when a certificate corresponds to the specific application, determine whether the certificate is valid based on an expiring date, and
- when it is determined that the certificate is not valid, notify that the certificate is not valid on the notification unit.

11. The multi-functional device according to claim 9, wherein the control device is further configured to:
- when externally receiving the instruction to register the specific certificate in correspondence with the specific application, determine whether a certificate corresponding to the specific application is registered in the management table, and
- when it is determined that there is the certificate corresponding to the specific application, notify certificate identifying information that identifies the certificate on the notification unit.

* * * * *